United States Patent
Balakrishnan et al.

(10) Patent No.: US 10,157,015 B2
(45) Date of Patent: Dec. 18, 2018

(54) TECHNIQUES OF PROTECTING ENVIRONMENT VARIABLES IN BOOTLOADER OF SERVICE PROCESSOR

(71) Applicant: American Megatrends, Inc., Norcross, GA (US)

(72) Inventors: Venkatesan Balakrishnan, Chennai (IN); Prakash Shanmugakani, Chennai (IN); Balasubramanian Chandrasekaran, Chennai (IN); Manikandan Ganesan Malliga, Dindigul (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 24 days.

(21) Appl. No.: 15/582,993

(22) Filed: May 1, 2017

(65) Prior Publication Data

US 2018/0314458 A1     Nov. 1, 2018

(51) Int. Cl.
*G06F 12/16* (2006.01)
*G06F 3/06* (2006.01)
*G06F 9/4401* (2018.01)

(52) U.S. Cl.
CPC ............ *G06F 3/0647* (2013.01); *G06F 3/067* (2013.01); *G06F 3/0619* (2013.01); *G06F 9/4406* (2013.01)

(58) Field of Classification Search
None
See application file for complete search history.

(56) References Cited

U.S. PATENT DOCUMENTS

| | | | |
|---|---|---|---|
| 2002/0042892 A1* | 4/2002 | Gold ................... | G06F 11/1417 714/6.11 |
| 2007/0174689 A1* | 7/2007 | Chen ................... | G06F 11/1417 714/13 |

* cited by examiner

Primary Examiner — Yong J Choe
(74) Attorney, Agent, or Firm — Locke Lord LLP; Tim Tingkang Xia, Esq.

(57) ABSTRACT

In an aspect of the disclosure, a method, a computer-readable medium, and an apparatus are provided. The apparatus may be a service processor. The service processor loads a primary copy of a collection of environment variables from a storage device of the service processor. The service processor determines whether the primary copy is integral. The service processor, in response to a determination that the primary copy is not integral: loads a backup copy of the collection of environment variables from the storage device, determines whether the backup copy is integral, and boots an operating system with the collection of environment variables of the backup copy in response to a determination that the backup copy is integral.

18 Claims, 6 Drawing Sheets

TECHNIQUES OF PROTECTING ENVIRONMENT VARIABLES IN BOOTLOADER OF SERVICE PROCESSOR

BACKGROUND

Field

The present disclosure relates generally to computer systems, and more particularly, to a service processor that utilizes a primary copy and a backup copy of a collection of environment variables to protect the environment variables.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device and also a service processor.

A bootloader of the BMC boots the BMC when the BMC is powered on or reset. When the bootloader starts, the bootloader loads a collection of environment variables from a storage device (e.g., an SPI flash memory) of the BMC and uses the environment variables to continue booting the BMC. The environment variables play an important role in system configuration and recovery. The environment variables include a MAC address for a network interface, boot arguments for the kernel of the OS 130, a current OS image selection, last boot state, boot failure count, etc. During the updating process The environment variables may be updated by an operating system (OS) or a service stack of the BMC. During this period, if the BMC reboots due to any reason, then the environment variables may get corrupted and the BMC may become a non-functional system (e.g., due to not have a MAC address). Therefore, there is a need for a mechanism that can better protect the environment variables.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a service processor. The service processor loads a primary copy of a collection of environment variables from a storage device of the service processor. The service processor determines whether the primary copy is integral. The service processor, in response to a determination that the primary copy is not integral: loads a backup copy of the collection of environment variables from the storage device, determines whether the backup copy is integral, and boots an operating system with the collection of environment variables of the backup copy in response to a determination that the backup copy is integral.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
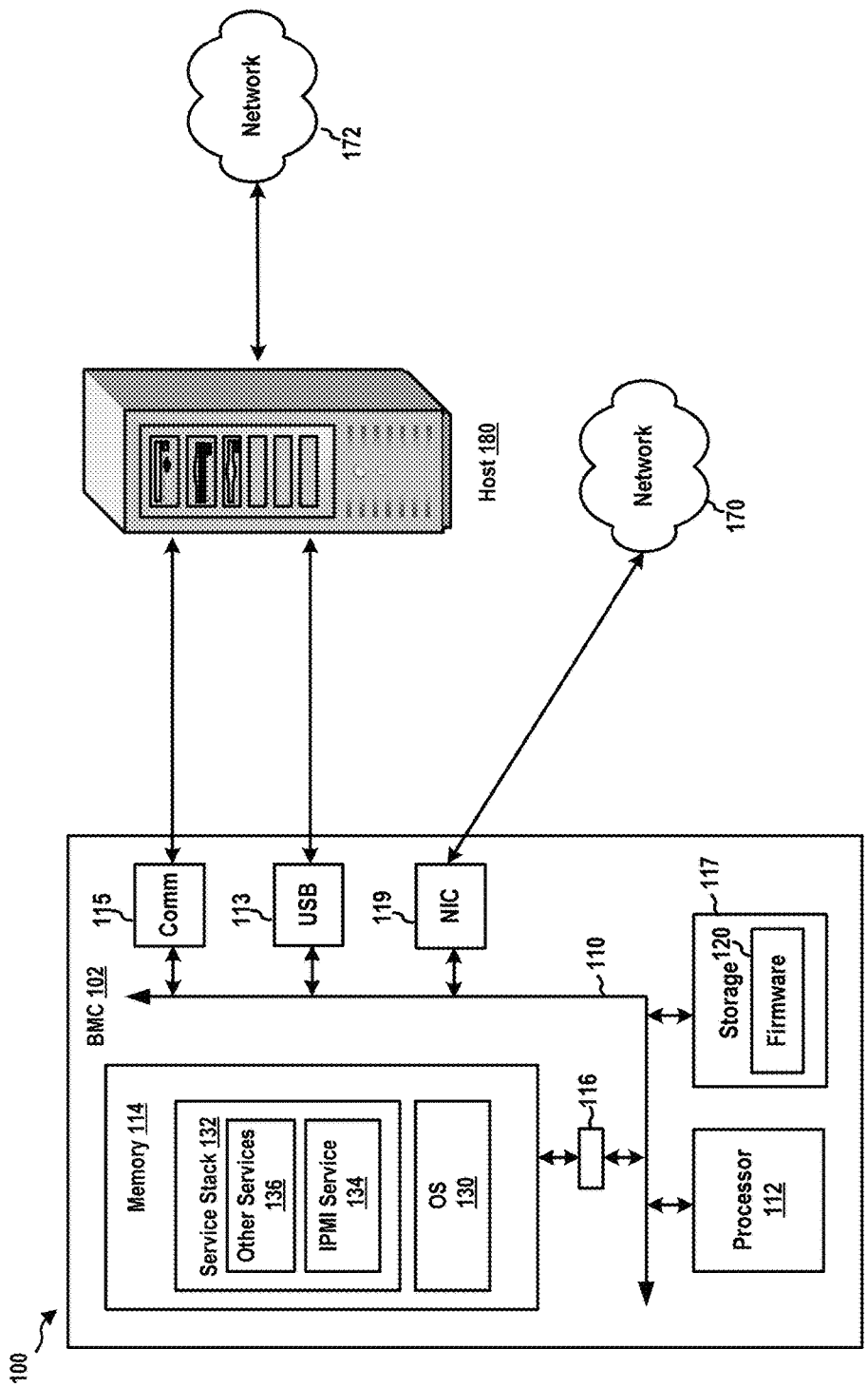
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating a computer system. In this example, the computer system includes, among other devices, a service processor 102 and a host computer 180. The service processor 102 has a processing unit 112, a memory 114, a memory driver 116, a storage 117, a network interface card 119, a USB interface 113, and communication interfaces 115. The communication interfaces 115 may include a keyboard controller style (KCS), a server management interface chip (SMIC), a block transfer (BT) interface, a system management bus system interface (SSIF), and/or other suitable communication interface(s). Further, the service processor 102 may support IPMI and may provide an IPMI interface between the service processor 102 and the host computer 180. The IPMI interface may be implemented over one or more of the USB interface 113, the network interface card 119, and the communication interfaces 115. In addition, the memory 114, the processing unit 112, the memory driver 116, the storage 117, the communication interfaces 115, and/or the network interface card 119 may be in communication with each other through a communication channel 110 such as a bus architecture.

The service processor 102 may store BMC firmware 120 in the storage 117. When the processing unit 112 executes the BMC firmware 120, the processing unit 112 loads code and data of the BMC firmware 120 into the memory 114. In particular, the BMC firmware 120 can provide in the memory 114 a service stack 132, which may include an IPMI service 134 and other services 136.

The service processor 102 may be in communication with the host computer 180 through the USB interface 113, the network interface card 119, the communication interfaces 115, and/or the IPMI interface. The service stack 132 of the service processor 102 manages the host computer 180 and is responsible for managing and monitoring the server vitals such as temperature and voltage levels. The service stack 132 can also facilitate administrators to remotely access and manage the host computer 180. In particular, the service processor 102 may manage the host computer 180 in accordance with IPMI. The IPMI service 134 may receive and send IPMI messages to the host computer 180 through the IPMI interface. Further, the host computer 180 may be connected to a data network 172. In one example, the host computer 180 may be a computer system in a data center. Through the data network 172, the host computer 180 may exchange data with other computer systems in the data center or exchange data with machines on the Internet.

Further, the service processor 102 may be in communication with a communication network 170 (e.g., a local area network (LAN)). In this example, the service processor 102 may be in communication with the communication network 170 through the network interface card 119. Further, the communication network 170 may be isolated from the data network 172 and out-of-band to the data network 172. In certain configurations, the communication network 170 may not be connected to the Internet.

Figure 2:
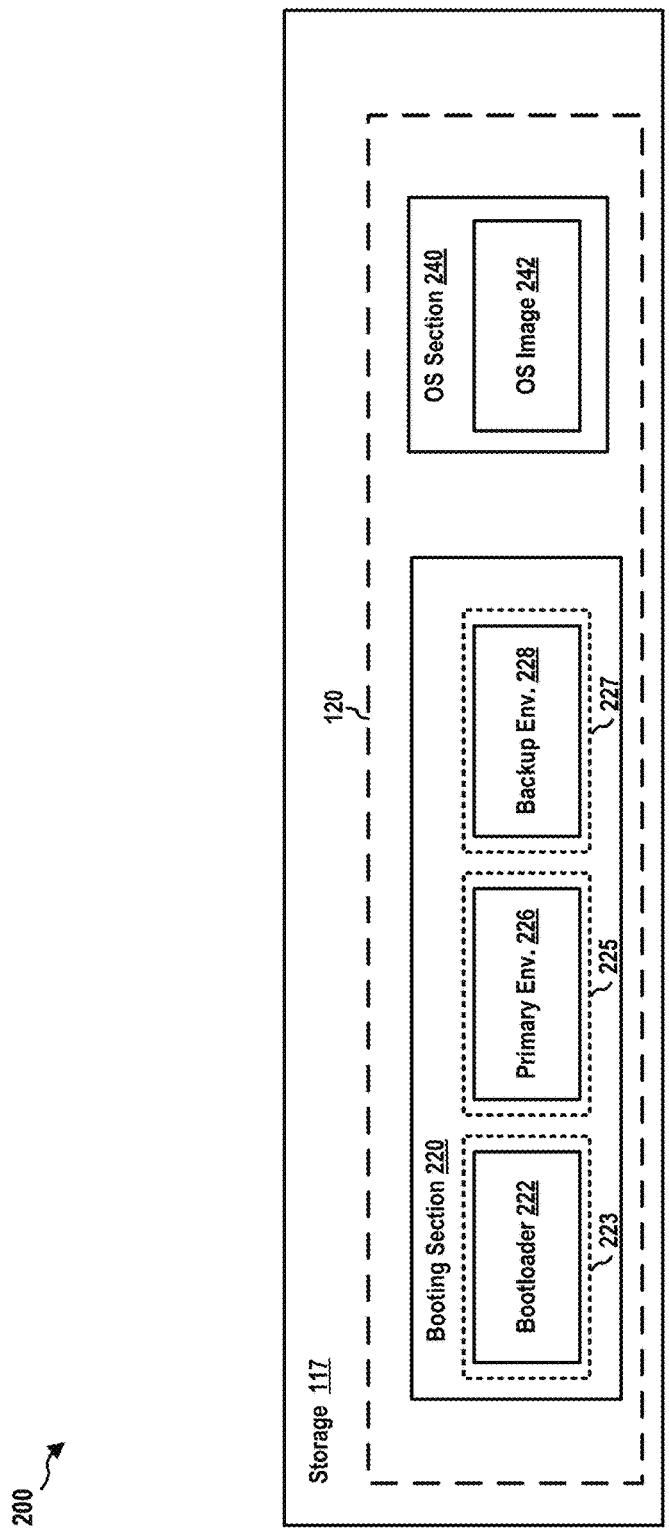
FIG. 2 is diagram illustrating a storage device.

FIG. 2 is another diagram 200 illustrating the storage 117 of the service processor 102 of FIG. 1. In one example, the storage 117 may be a Serial Peripheral Interface Bus (SPI) flash memory. In certain configurations, the BMC firmware 120 are stored in different sections of the storage 117. For example, the storage 117 may include, among other sections, a booting section 220 and an OS section 240. The booting section 220 includes a bootloader sector 223, a primary sector 225, and a backup sector 227. As described infra, the bootloader sector 223 stores a bootloader 222; the primary sector 225 stores a primary environment variables collection 226; and the backup sector 227 stores a backup environment variables collection 228. When the storage 117 is an SPI flash memory, each of the primary sector 225 and the backup sector 227 may be one erase block in the SPI flash memory. Further, the OS section 240 stores an OS image 242.

During the initial booting process, the bootloader 222 is responsible for, among other things, initializing the peripherals of the service processor 102 and loading the OS image 242 into the memory 114 as well as starting the OS 130. For example, the OS 130 may be embedded LINUX®, and the bootloader 222 may be UBOOT®.

In order to initialize hardware components of the service processor 102 and to boot the OS 130, the bootloader 222 needs to use the environment variables contained the primary environment variables collection 226/backup environment variables collection 228. The environment variables play an important role in system configuration and recovery. The environment variables include an MAC address for the network interface, boot arguments for the kernel of the OS 130, a current OS image selection (e.g., the OS image 242 stored in the storage 117), last boot state, boot failure count, etc.

The bootloader 222 may loads the primary environment variables collection 226/backup environment variables collection 228 as a binary large object (BLOB) from the storage 117 to the memory 114. The bootloader 222 can retrieve the environment variables from the BLOB containing the primary environment variables collection 226 or backup environment variables collection 228. The environment variables are stored as name value pairs. The primary environment variables collection 226 and the backup environment variables collection 228 each contain a checksum. The bootloader 222 validates the checksum of a BLOB containing a collection of environment variables before the bootloader 222 uses the environment variables in that BLOB. The integrity check is needed because the BLOB contains sensitive information such a network interface card (NIC) count, a network interface mode, boot arguments, MAC addresses for network interfaces, etc.

In certain configurations, when the storage 117 was initially build, a default collection of environment variables is stored in the primary sector 225 as the primary environment variables collection 226 and is also stored in the backup sector 227 as the backup environment variables collection 228.

Alternatively, in certain configurations, when the bootloader 222 for the first time starts booting the OS 130, the bootloader 222 determines whether there is a primary environment variables collection 226 or a backup environment variables collection 228 stored at the booting section 220. As this is the first time, the bootloader 222 would not be able to find a stored collection of environment variables in the primary sector 225 or the backup sector 227. Accordingly, the bootloader 222 uses a default collection of environment variables that is provided with the bootloader 222. Further, the bootloader 222 may store the default collection in the primary sector 225 as the primary environment variables collection 226 and also in the backup sector 227 as the backup environment variables collection 228.

A counter is included in each of the primary environment variables collection 226 and the backup environment variables collection 228. For example, the counter may be a 64-bit counter. Each time a variable in a collection is updated, the counter in that collection is incremented (e.g., by 1). The counters in the primary environment variables collection 226 and the backup environment variables collection 228 have the same value initially (e.g., 0). As described infra, in ideal scenarios, both collections are updated together and should have the same environment variables and values. But in scenarios where a change is made in one collection but not the other, the collection having the most recent change will have a higher counter value than that of the collection having not been successfully updated. Therefore, by comparing the values of the counters, the bootloader 222 can determine which one of the primary environment variables collection 226 and the backup environment variables collection 228 has been updated the most recently.

Figure 3:
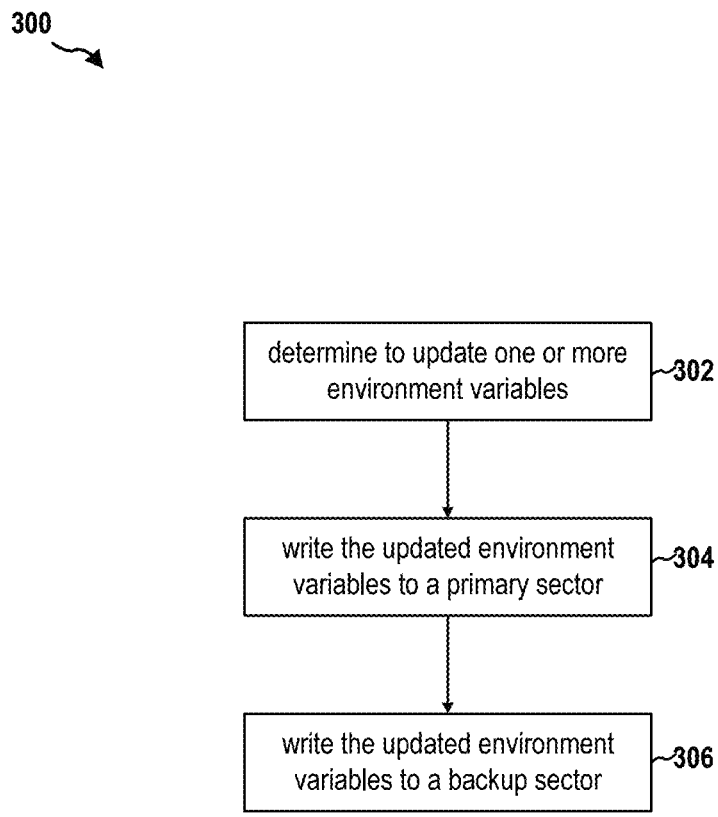
FIG. 3 is a flow chart of a method (process) for updating environment variables.

FIG. 3 is a flow chart 300 of a method (process) for updating environment variables. The method may be performed by a service processor (e.g., the service processor 102, the apparatus 102'). In this example, the bootloader 222 of the service processor 102 has successfully loaded the OS 130 from the OS image 242 into the memory 114, and the processing unit 112 is executing the OS 130 and the service stack 132, which is running on top of the OS 130.

At operation 302, the OS 130 or the service stack 132 determines to update one or more environment variables stored in the primary environment variables collection 226 and backup environment variables collection 228. For example, the MAC address of a network interface may have been changed. Both collections should be updated together in order to keep the environment variables of both collections in synchronization.

At operation 304, the OS 130 or the service stack 132 updates the one or more environment variables of the primary environment variables collection 226 stored in the primary sector 225 of the storage 117. In this example, the storage 117 may be an SPI flash memory. Accordingly, to update the one or more environment variables, the OS 130 or the service stack 132 reads the entire primary environment variables collection 226 from the primary sector 225 into the memory 114 as a BLOB, and then erases the data in the primary sector 225. The OS 130 or the service stack 132 updates the variables in the BLOB in the memory and increments the counter in the BLOB. Further, the OS 130 or the service stack 132 may generate a checksum for the BLOB. A checksum is a small-sized datum derived from a block of digital data for the purpose of detecting errors which may have been introduced during its transmission or storage. In certain configurations, the OS 130 or the service stack 132 may use the BLOB as input of a particular checksum function/algorithm (e.g., Fletcher's checksum, Adler-32, and cyclic redundancy checks (CRCs)) to generate the checksum. The OS 130 or the service stack 132 then includes the calculated checksum in the BLOB. Subsequently, the OS 130 or the service stack 132 writes the updated BLOB back to the primary sector 225.

At operation 306, the OS 130 or the service stack 132 updates the same one or more environment variables contained in the backup environment variables collection 228 stored in the backup sector 227 of the storage 117. In this example, the storage 117 may be an SPI flash memory. Accordingly, to update the one or more environment variables, the OS 130 or the service stack 132 reads the entire backup environment variables collection 228 from the backup sector 227 into the memory 114 as a BLOB, and then erases the data in the backup sector 227. The OS 130 or the service stack 132 updates the variables in the BLOB in the memory, increments the counter in the BLOB. Further, the OS 130 or the service stack 132 may generate a checksum for the BLOB and includes the generated checksum in the BLOB. The OS 130 or the service stack 132 then writes the updated BLOB back to the backup sector 227.

During operation 304 and operation 306, if the service processor 102 reboots due to any reason, the primary environment variables collection 226 or the backup environment variables collection 228 may be corrupted, as the operations may not be completed.

Figure 4:
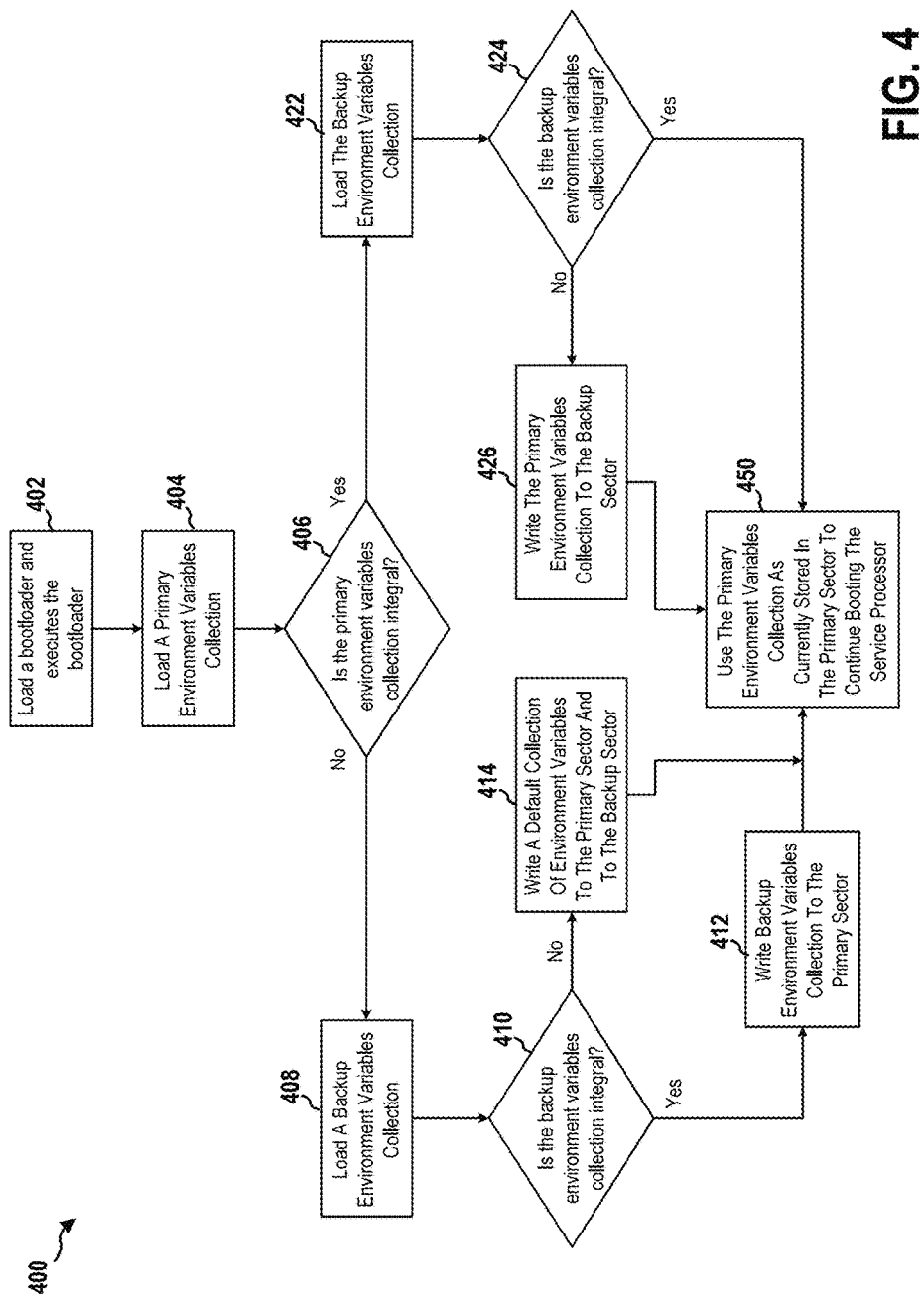
FIG. 4 is a flow chart of a method (process) for protecting environment variables.

FIG. 4 is a flow chart 400 of a method (process) for protecting environment variables. The method may be performed by a service processor (e.g., the service processor 102, the apparatus 102').

At operation 402, the processing unit 112 loads the bootloader 222 from the booting section 220 into the memory 114 and executes the bootloader 222. At operation 404, the bootloader 222 loads the primary environment variables collection 226 as a BLOB from the primary sector 225.

At operation 406, the bootloader 222 determines whether the BLOB containing the primary environment variables collection 226 is integral. For example, the bootloader 222 may verify the checksum contained in the BLOB. In particular, the bootloader 222 may generate a checksum based on the BLOB using the same checksum function/algorithm as that used by the OS 130 or the service stack 132 as described supra with respect to operation 304. The bootloader 222 then determines whether the checksum generated by the bootloader 222 matches the checksum contained in the BLOB. If they match, the bootloader 222 may determine that the BLOB is integral. Otherwise, the bootloader 222 may determine that the BLOB is not integral.

When the BLOB containing the primary environment variables collection 226 is not integral, at operation 408, the bootloader 222 further loads the backup environment variables collection 228 stored in the backup sector 227 as a BLOB into the memory 114.

At operation 410, the bootloader 222 determines whether the BLOB containing the backup environment variables collection 228 is integral. Similarly, the bootloader 222 may verify the checksum contained in the BLOB. In particular, the bootloader 222 may generate a checksum based on the BLOB using the same checksum function/algorithm as that used by the OS 130 or the service stack 132 as described supra with respect to operation 306. The bootloader 222 then determines whether the checksum generated by the bootloader 222 matches the checksum contained in the BLOB. If they match, the bootloader 222 may determine that the BLOB is integral. Otherwise, the bootloader 222 may determine that the BLOB is not integral.

When the BLOB containing the backup environment variables collection 228 is integral, at operation 412, the bootloader 222 writes that BLOB to the primary sector 225. That is, the bootloader 222 replaces the primary environment variables collection 226 stored in the primary sector 225 with the backup environment variables collection 228 currently in the memory 114. In this example, the storage 117 may be an SPI flash memory. Accordingly, the bootloader 222 may erase the data in the primary sector 225. Then, the bootloader 222 writes the BLOB containing the backup environment variables collection 228 into the primary sector 225. As such, the backup environment variables collection 228 becomes the primary environment variables collection 226 stored in the primary sector 225.

At operation 450, the bootloader 222 uses the collection of environment variables contained in the memory 114 that is identical to the primary environment variables collection 226 currently stored in the primary sector 225 to continue booting the service processor 102.

Subsequent to operation 410, when the BLOB containing the backup environment variables collection 228 is not integral, at operation 414, the bootloader 222 may locate the default collection of environment variables provided with the bootloader 222. The bootloader 222 writes the default collection of environment variables to the primary sector 225 to replace the stored primary environment variables collection 226 and to the backup sector 227 to replace the stored backup environment variables collection 228. As such, the default collection of environment variables becomes the primary environment variables collection 226 and the backup environment variables collection 228. The primary environment variables collection 226 currently stored in the primary sector 225 is identical to the default collection of environment variables in the memory 114. Subsequently, the bootloader 222 proceeds with performing operation 450, which was described supra.

Subsequent to operation 406, when the BLOB containing the primary environment variables collection 226 is integral, at operation 422, the bootloader 222 further loads the backup environment variables collection 228 stored in the backup sector 227 as a BLOB into the memory 114.

At operation 424, the bootloader 222 determines whether the BLOB containing the backup environment variables collection 228 is integral, which is similar to operation 410. Further, in certain configurations, the bootloader 222 may compare the counter values of the primary environment variables collection 226 and the backup environment variables collection 228. If the counter value of the primary environment variables collection 226 is greater than that of the backup environment variables collection 228, the bootloader 222 may determine that the BLOB containing the backup environment variables collection 228 is not integral. Consequently, the bootloader 222 goes to operation 426. When the BLOB containing the backup environment variables collection 228 is integral, the bootloader 222 proceeds with performing operation 450, which was described supra. If the counter value of the primary environment variables collection 226 is smaller than that of the backup environment variables collection 228, the bootloader 222 may determine that the BLOB containing the primary environment variables collection 226 is actually not integral. Consequently, the bootloader 222 goes back to operation 406 and determines in that operation that the BLOB containing the primary environment variables collection 226 is not integral.

When the BLOB containing the backup environment variables collection 228 is not integral, at operation 426, the bootloader 222 writes the BLOB containing the primary environment variables collection 226 to the backup sector 227. That is, the bootloader 222 replaces the backup environment variables collection 228 stored in the backup sector 227 with the primary environment variables collection 226 in the memory 114. In this example, the storage 117 may be an SPI flash memory. Accordingly, the bootloader 222 may erase the data in the backup sector 227. Then, the bootloader 222 writes the BLOB containing the primary environment variables collection 226 into the backup sector 227. As such, the primary environment variables collection 226 becomes the backup environment variables collection 228 stored in the backup sector 227. Subsequently, the bootloader 222 proceeds with performing operation 450, which described supra.

Figure 5:
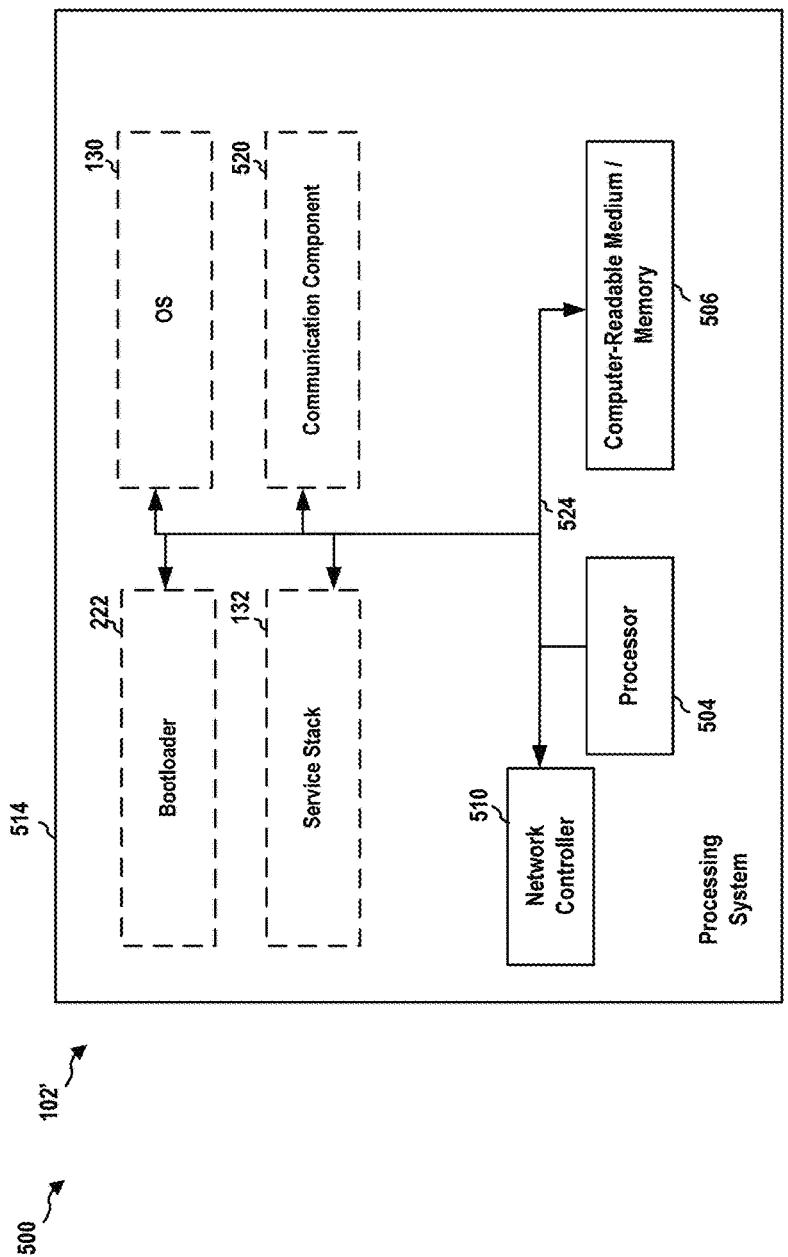
FIG. 5 is a diagram illustrating an example of a hardware implementation for an apparatus employing a processing system.

FIG. 5 is a diagram 500 illustrating an example of a hardware implementation for an apparatus 102' employing a processing system 514. The apparatus 102' may implement the service processor 102. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the computer-readable medium/memory 506, a network controller 510, etc. The computer-readable medium/memory 506 may include the memory 114 and/or the storage 117. The bus 524 may also link various other circuits such as timing sources, peripherals, voltage regulators, and power management circuits, which are well known in the art, and therefore, will not be described any further.

The processing system 514 may be coupled to the network controller 510. The network controller 510 provides a means for communicating with various other apparatus over a network. The network controller 510 receives a signal from the network, extracts information from the received signal, and provides the extracted information to the processing system 514, specifically a communication component 520 of the apparatus 102'. In addition, the network controller 510 receives information from the processing system 514, specifically the communication component 520, and based on the received information, generates a signal to be sent to the network. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system further includes at least one of the bootloader 222, the OS 130, and the service stack 132. The components may be software components running in the processor 504, resident/stored in the computer readable medium/memory 506, one or more hardware components coupled to the processor 504, or some combination thereof.

The apparatus 102' may be configured to include means for performing operations described supra referring to FIGS. 3-4. The aforementioned means may be one or more of the aforementioned components of the apparatus 102 and/or the processing system 514 of the apparatus 102' configured to perform the functions recited by the aforementioned means.

Figure 6:
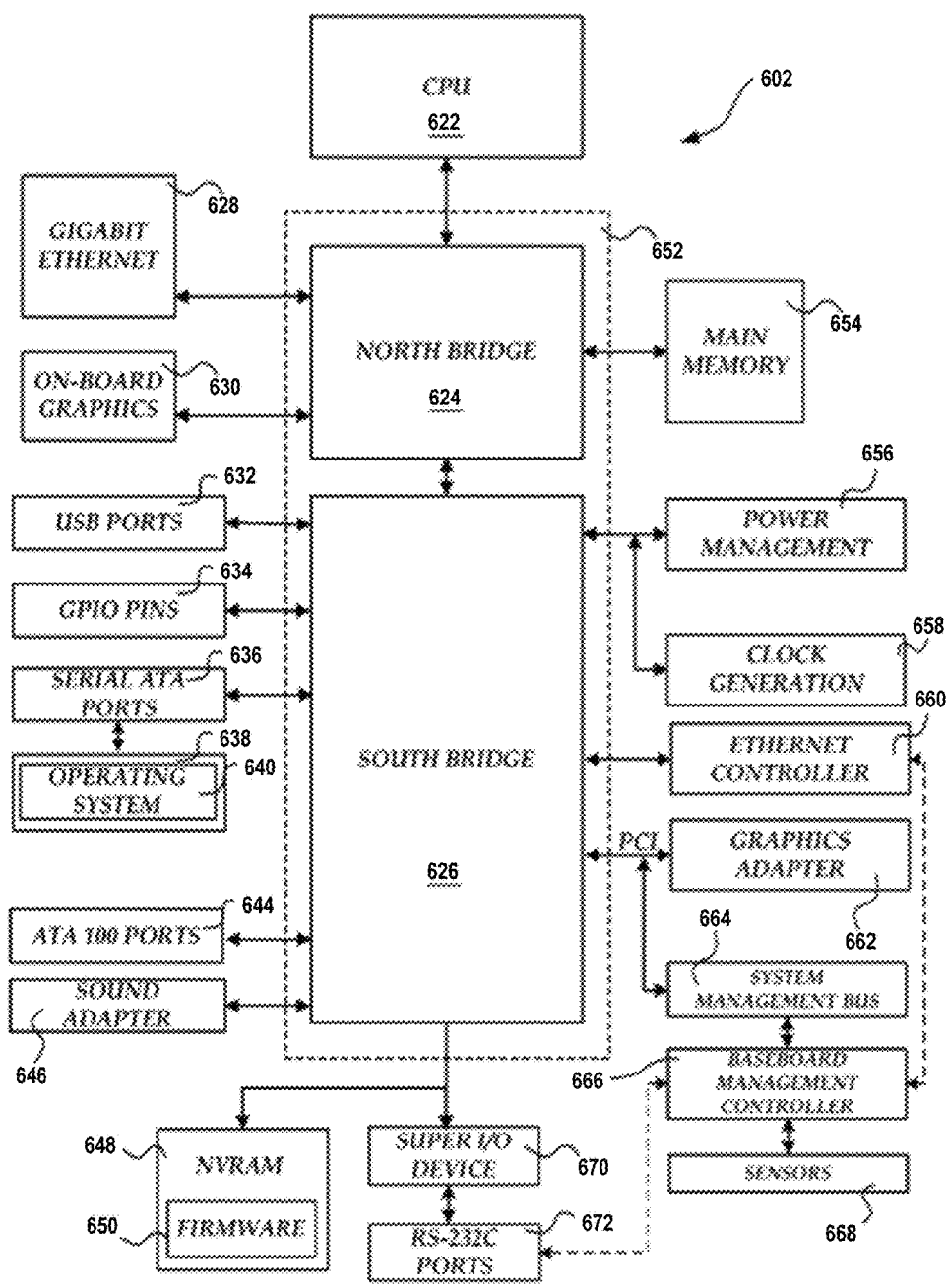
FIG. 6 shows a computer architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 180, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention, the operating system 640 comprises an operating system within the WINDOWS family of operating systems from MICROSOFT CORPORATION. According to another embodiment, the operating system 640 comprises the UNIX, LINUX, or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. The BMC 666 may be the service processor 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a service processor, comprising:
    loading a primary copy of a collection of environment variables from a storage device of the service processor;
    determining whether the primary copy is integral, wherein the primary copy is integral when the primary copy contains no corrupted environment variables, and is not integral when the primary copy includes one or more corrupted environment variables;
    in response to a determination that the primary copy is not integral:
        loading a backup copy of the collection of environment variables from the storage device;
        determining whether the backup copy is integral; and
        booting an operating system with the collection of environment variables of the backup copy in response to a determination that the backup copy is integral; and
    in response to a determination that the primary copy is integral:
        loading the backup copy of the collection of environment variables from the storage device;
        determining whether the backup copy is integral; and
        booting the operating system with the collection of environment variables of the primary copy.

2. The method of claim 1, wherein the primary copy and the backup copy each are in a binary large object (BLOB) format.

3. The method of claim 1, wherein the primary copy is stored at a first location of the storage device, wherein the backup copy is stored at a second location of the storage device, the method further comprising, in response to the determination that the primary copy is not integral and the determination that the backup copy is integral:
    replacing the primary copy stored at the first location with the backup copy such that the backup copy stored at the first location becomes the primary copy, wherein the operating system is booted with the collection of environment variables that is identical to the collection of environment variables of the primary copy stored in the first location.

4. The method of claim 1, wherein the primary copy is stored at a first location of the storage device, wherein the backup copy is stored at a second location of the storage device, the method further comprising, in response to the determination that the primary copy is not integral and a determination that the backup copy is not integral:
replacing the primary copy stored at the first location with a default copy of the collection of environment variables such that the default copy stored at the first location becomes the primary copy;
replacing the backup copy stored at the second location with the default copy such that the default copy stored at the second location becomes the backup copy; and
booting an operating system with the collection of environment variables that is identical to the collection of environment variables of the primary copy stored in the first location.

5. The method of claim 1, wherein the primary copy is stored at a first location of the storage device, wherein the backup copy is stored at a second location of the storage device, the method further comprising, in response to the determination that the primary copy is integral and the determination that the backup copy is not integral:
replacing the backup copy stored at the second location with the primary copy such that the primary copy stored at the second location becomes the backup copy.

6. The method of claim 1, further comprising, in response to the determination that the primary copy is integral and the determination that the backup copy is integral:
comparing a counter value of the primary copy with a counter value of the backup copy.

7. An apparatus, the apparatus being a service processor, comprising:
a memory; and
at least one processor coupled to the memory and configured to:
load a primary copy of a collection of environment variables from a storage device of the service processor;
determine whether the primary copy is integral, wherein the primary copy is integral when the primary copy contains no corrupted environment variables, and is not integral when the primary copy includes one or more corrupted environment variables;
in response to a determination that the primary copy is not integral:
load a backup copy of the collection of environment variables from the storage device;
determine whether the backup copy is integral; and
boot an operating system with the collection of environment variables of the backup copy in response to a determination that the backup copy is integral; and
in response to a determination that the primary copy is integral:
load the backup copy of the collection of environment variables from the storage device;
determine whether the backup copy is integral; and
boot the operating system with the collection of environment variables of the primary copy.

8. The apparatus of claim 7, wherein the primary copy and the backup copy each are in a binary large object (BLOB) format.

9. The apparatus of claim 7, wherein the primary copy is stored at a first location of the storage device, wherein the backup copy is stored at a second location of the storage device, wherein the at least one processor is further configured to, in response to the determination that the primary copy is not integral and the determination that the backup copy is integral:
replace the primary copy stored at the first location with the backup copy such that the backup copy stored at the first location becomes the primary copy, wherein the operating system is booted with the collection of environment variables that is identical to the collection of environment variables of the primary copy stored in the first location.

10. The apparatus of claim 7, wherein the primary copy is stored at a first location of the storage device, wherein the backup copy is stored at a second location of the storage device, wherein the at least one processor is further configured to, in response to the determination that the primary copy is not integral and a determination that the backup copy is not integral:
replace the primary copy stored at the first location with a default copy of the collection of environment variables such that the default copy stored at the first location becomes the primary copy;
replace the backup copy stored at the second location with the default copy such that the default copy stored at the second location becomes the backup copy; and
boot an operating system with the collection of environment variables that is identical to the collection of environment variables of the primary copy stored in the first location.

11. The apparatus of claim 7, wherein the primary copy is stored at a first location of the storage device, wherein the backup copy is stored at a second location of the storage device, wherein the at least one processor is further configured to, in response to the determination that the primary copy is integral and the determination that the backup copy is not integral:
replace the backup copy stored at the second location with the primary copy such that the primary copy stored at the second location becomes the backup copy.

12. The apparatus of claim 7, wherein the at least one processor is further configured to, in response to the determination that the primary copy is integral and the determination that the backup copy is integral:
compare a counter value of the primary copy with a counter value of the backup copy.

13. A non-transitory computer-readable medium storing computer executable code for operating a service processor, comprising code to:
load a primary copy of a collection of environment variables from a storage device of the service processor;
determine whether the primary copy is integral, wherein the primary copy is integral when the primary copy contains no corrupted environment variables, and is not integral when the primary copy includes one or more corrupted environment variables;
in response to a determination that the primary copy is not integral:
load a backup copy of the collection of environment variables from the storage device;
determine whether the backup copy is integral; and
boot an operating system with the collection of environment variables of the backup copy in response to a determination that the backup copy is integral; and in response to a determination that the primary copy is not integral:
    load the backup copy of the collection of environment variables from the storage device;
    determine whether the backup copy is integral; and
    boot the operating system with the collection of environment variables of the primary copy.

14. The non-transitory computer-readable medium of claim 13, wherein the primary copy and the backup copy each are in a binary large object (BLOB) format.

15. The non-transitory computer-readable medium of claim 13, wherein the primary copy is stored at a first location of the storage device, wherein the backup copy is stored at a second location of the storage device, wherein the code is further configured to, in response to the determination that the primary copy is not integral and the determination that the backup copy is integral:
    replace the primary copy stored at the first location with the backup copy such that the backup copy stored at the first location becomes the primary copy, wherein the operating system is booted with the collection of environment variables that is identical to the collection of environment variables of the primary copy stored in the first location.

16. The non-transitory computer-readable medium of claim 13, wherein the primary copy is stored at a first location of the storage device, wherein the backup copy is stored at a second location of the storage device, wherein the code is further configured to, in response to the determination that the primary copy is not integral and a determination that the backup copy is not integral:
    replace the primary copy stored at the first location with a default copy of the collection of environment variables such that the default copy stored at the first location becomes the primary copy;
    replace the backup copy stored at the second location with the default copy such that the default copy stored at the second location becomes the backup copy; and
    boot an operating system with the collection of environment variables that is identical to the collection of environment variables of the primary copy stored in the first location.

17. The non-transitory computer-readable medium of claim 13, wherein the primary copy is stored at a first location of the storage device, wherein the backup copy is stored at a second location of the storage device, wherein the code is further configured to, in response to the determination that the primary copy is integral and the determination that the backup copy is not integral:
    replace the backup copy stored at the second location with the primary copy such that the primary copy stored at the second location becomes the backup copy.

18. The non-transitory computer-readable medium of claim 13, wherein the code is further configured to, in response to the determination that the primary copy is integral and the determination that the backup copy is integral:
    compare a counter value of the primary copy with a counter value of the backup copy.

* * * * *